United States Patent [19]

Björn

[11] Patent Number: 4,603,650
[45] Date of Patent: Aug. 5, 1986

[54] BOAT, THE BOTTOM OF WHICH IS PROVIDED WITH A PLURALITY OF DOWNWARDLY OPENING CHANNELS

[76] Inventor: Tord Björn, Flöjtvägen 2, S-890 10 Bjästa, Sweden

[21] Appl. No.: 661,071

[22] Filed: Oct. 15, 1984

[51] Int. Cl.⁴ .............................................. B63B 1/32
[52] U.S. Cl. ................................................... 114/288
[58] Field of Search .................. 114/56, 57, 62, 67 A, 114/288–291, 355–358

[56] References Cited

U.S. PATENT DOCUMENTS

| | | | |
|---|---|---|---|
| 1,514,695 | 11/1924 | Grenier | 114/290 |
| 1,656,411 | 1/1928 | Baldwin | 114/67 A |
| 2,044,771 | 6/1936 | Carr, Jr. | 114/290 |
| 3,077,172 | 2/1963 | Dornak | 114/62 |
| 3,216,389 | 11/1965 | Thorsen | 114/56 |
| 3,226,739 | 1/1966 | Noe | 114/56 |

FOREIGN PATENT DOCUMENTS 471741 9/1937 United Kingdom .

Primary Examiner—Galen L. Barefoot
Assistant Examiner—Jesûs D. Sotelo
Attorney, Agent, or Firm—Charles E. Brown; Charles A. Brown

[57] ABSTRACT

This invention relates to a boat, the bottom of which is provided with a plurality of downwardly opening channels intended to receive air during the forward movement of the boat in order to produce a reduction of the friction between the water and the bottom surface. In order to make the air inflow into the channels easier these are, regarded from above and from below respectively, extending along their whole extension mainly parallel to the bottom line of the boat in the direction astern from places at the stem of the boat above the water surface to places under the water surface.

1 Claim, 5 Drawing Figures

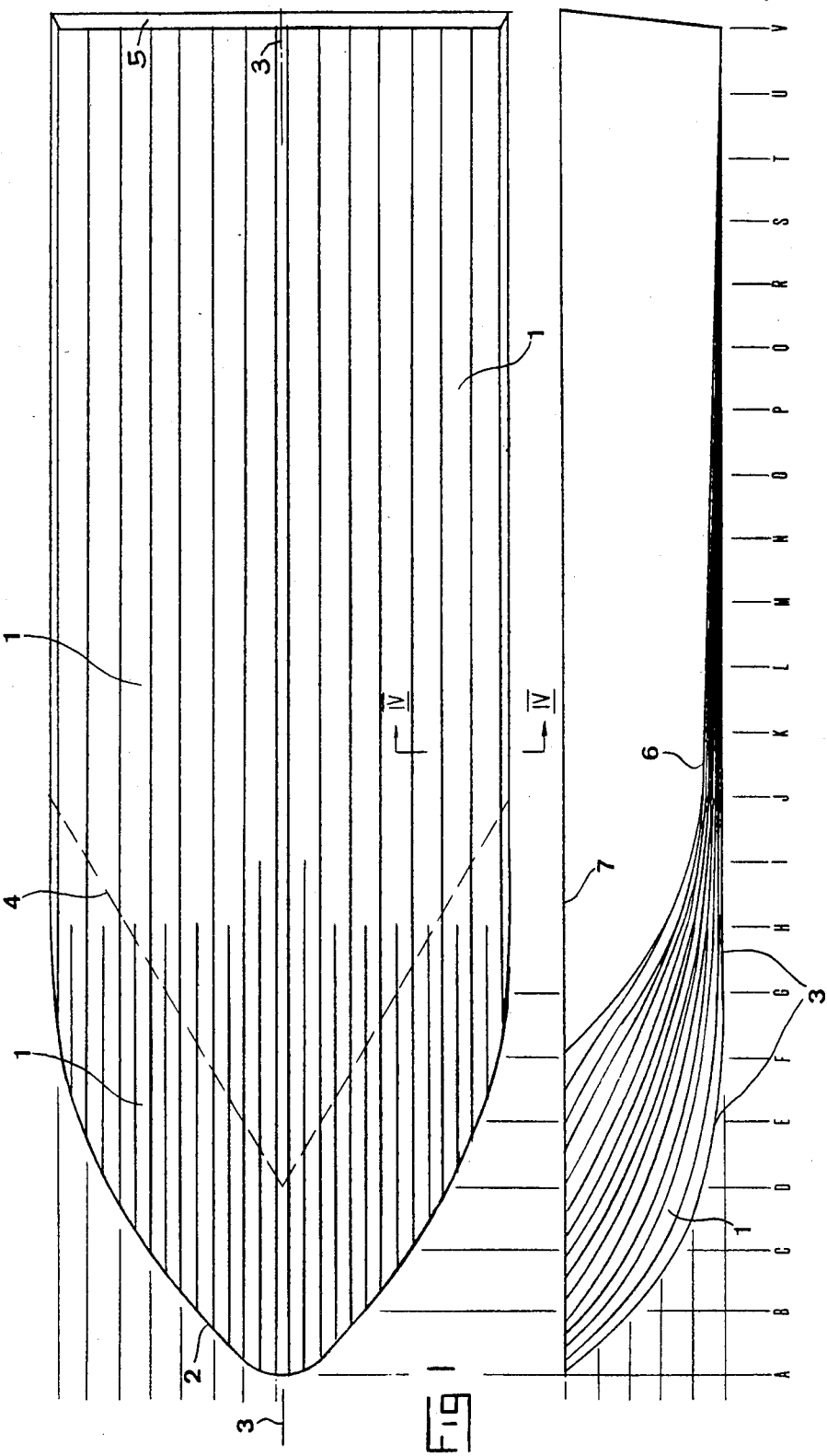

BOAT, THE BOTTOM OF WHICH IS PROVIDED WITH A PLURALITY OF DOWNWARDLY OPENING CHANNELS

FIELD OF THE INVENTION

This invention relates to means for the transport on water or a boat, the bottom of which is provided with a plurality of downwardly opening channels intended to receive air during the forward movement of the boat for producing a reduction of the friction between the water and the bottom surface. Especially, the invention relates to the so called gliding or at least the so called half-gliding boats.

DESCRIPTION OF THE PRIOR ART

It is already known to arrange such channels or grooves in the bottom of boats for the purpose to obtain air cushions or flows under the bottoms for the reduction of the water resistance. However, it has turned out that the known channels are designed, especially in the region of the stem of the boat, in such a way so that they cannot in an efficient manner lead the air flows downwardly under the boat bottom.

SUMMARY OF THE INVENTION

The object of the invention is to improve the effect of reducing the water resistance in boats of the type described above. According to the invention this object is obtained by the fact that the channels, regarded from above and from below respectively, extend along their whole extension generally parallel to the bottom line of the boat in a direction astern from places at the stem of the boat above the water surface to places under the water surface. Thanks to that, the channels at the stem of the boat will in a manner as efficient as possible receive the air flows which are thereafter led on in the channels astern.

In the known arrangements the channels are more or less curved with respect to the bottom line. Herethrough, the air flows will in a substantially greater extent be led to the sides of the boat and a comparatively small air quantity will be led in the channels under the bottom.

According to the invention it will be preferred that a separate channel is limited laterally by two essentially vertical wall portions. The bottoms of the channels are preferred to be mainly horizontal, which for V-bottom boats causes that several channels located beside each other will form a step-like structure.

BRIEF DESCRIPTION OF THE DRAWINGS

With reference to the appended drawings, below follows a more specific description of an embodiment according to the invention. In the drawings:

FIG. 1 is a view from below of the boat bottom according to the invention;

FIG. 2 is a side view of the body of the boat;

DESCRIPTION OF THE PREFERRED EMBODIMENT

Figure 3:
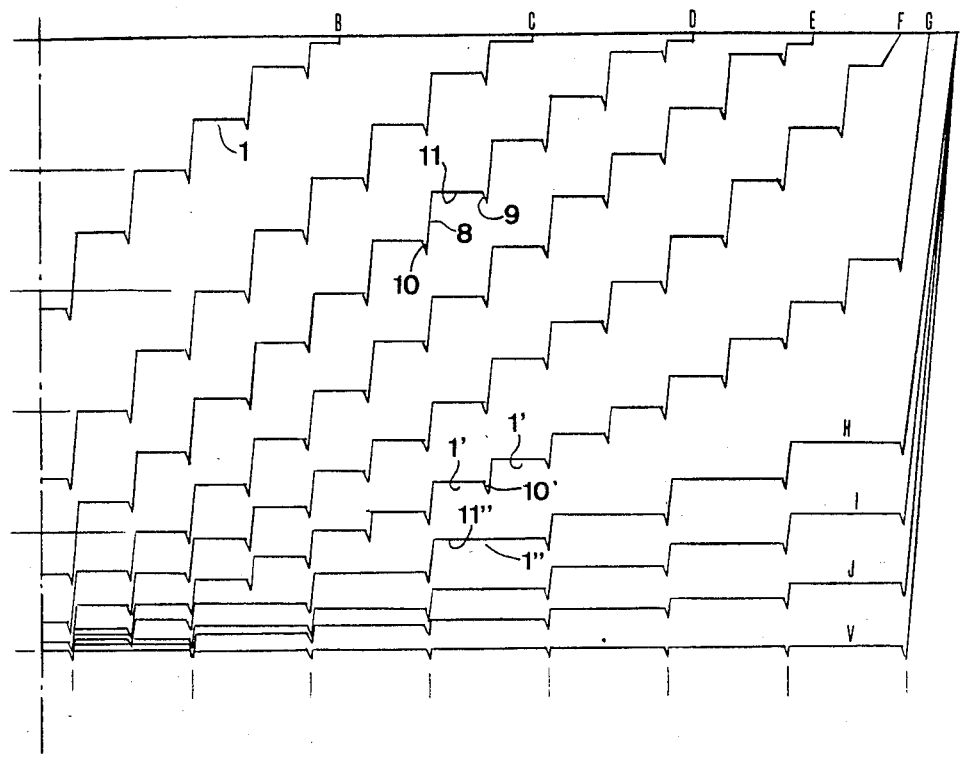
FIG. 3 shows a number of cross sections illustrating the form of the one half of the bottom of the boat, whereby it should be understood that the form of the other bottom half is a reflected image of what is illustrated in FIG. 3.

The bottom of the boat illustrated in FIGS. 1-4 is provided with a plurality of downwardly open channels 1 intended to receive air during the forward movement of the boat in order to produce a reduction of the friction between the water and the bottom surface. The channels are, regarded from above and from below respectively, extending along their whole extension mainly parallel to the bottom line of the boat in the direction astern from places at the stem 2 of the boat above the water surface to places under the water surface. The bottom line or keel line is in FIG. 1 indicated by the reference numeral 3. The water line extends approximately as illustrated in FIG. 1 by the dashed lines 4 when the boat lies still in the water and is unloaded. The square stern 5 of the boat has in this embodiment a flat design.

In FIG. 2 the form of the bilge of the boat from stem to stern is indicated by the reference numeral 6 and the deck or railing line of the boat is indicated by the reference numeral 7. As is clear from FIGS. 1 and 2 the channels 1 are extending from the region of the railing line 7 at the stem of the boat out to the very square stern 5.

In FIG. 2 different places along the length of the boat are indicated with the letters A-V. In FIG. 3 a number of cross sections through the boat bottom are illustrated. These cross section lines are in FIG. 3 denoted with letters corresponding to the letters in FIG. 2. It should be noted that in FIG. 3 only the bottom cross sections of the port half of the body of the boat is illustrated for the sake of clearness because the starboard half of the bottom of the boat is only a reflected image of the port half. Thus, the starboard half in practice should be illustrated at the left side of FIG. 3.

FIG. 3 makes clear that the bottom of the boat mainly have a V-like design and that the V-form is most peaked at the stem and it becomes thereafter in the direction astern more and more blunt. At the square stern 5, which means the longitudinal section V, the bottom form is mainly levelled.

Figure 4:
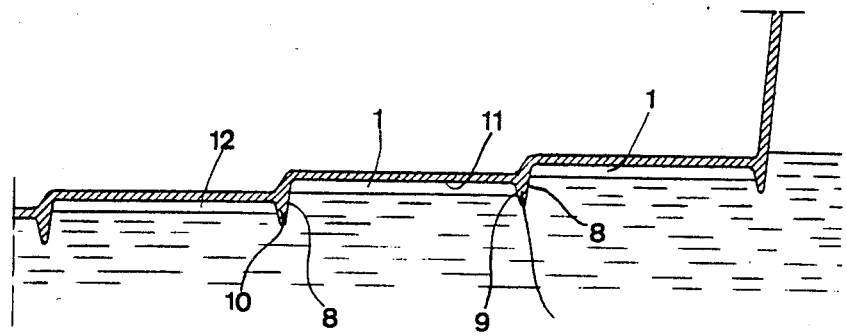
FIG. 4 is a cross section along the line IV—IV in FIG. 1.

As appears by FIG. 4 a single channel 1 is limited laterally of two mainly vertical wall portions 8, 9. The wall portion 9 is formed by a downwardly projecting projection 10, while the wall portion 8 partly is formed by another similar projection 10. The projection 10 can, as illustrated in the example, have a slightly downwardly contracting design. The projections 10 are extending along the whole extension of the channels. The bottoms 11 of the channels 1 are mainly horizontal.

The total width of the channels 1 across the longitudinal direction of the boat is over 50%, suitably over 70% and preferably over 90%, of the bottom width. As appears by FIGS. 3 and 4 several channels located beside each other are forming a step-like structure with the projections forming extensions of generally vertical side walls of the channels.

For the V-bottom boats of the type illustrated by the drawings it is advantageous that the widths of the channels are less at the stem of the boat than at the stern of the boat. For this reason, as appears by FIG. 3, two channels 1' can turn into a single channel 1'', suitably through that the bottoms of the channels 1' gradually are coming closer to each other while the projection 10' between these channels 1' is reduced until the bottoms and projections are turned into the bottom 11'' of the channel 1″. This transition takes place along the whole width of the boat bottom so that the channel number before the transition is reduced to the half after the transition. This is also clearly shown in FIG. 1. The transition is located at that place along the length of the boat, where the V-form of the bottom is beginning to become relatively small. The greater number of channels at the stem of the boat gives the boat better sea qualities.

During the forward movement of the boat, as appears by FIG. 4, air cushions 12 are formed inside the channels 1 and these air cushions substantially reduce the friction between the water and the bottom of the boat. The projections 10 function as air blockings which prevent the air in the channels 1 to be transported in the direction outwardly towards the sides of the boat. Because the channels, regarded from above and from below respectively, always are extending mainly parallel to the real or imagined bottom line of the boat, the entrance of the air in the channels and the passage of the air in the channels downwardly beneath the water surface will be made easier. It is obvious that the speed of the boat must rise above a certain value before the air cushions 12 are produced along the length of the channels 1 between the surface of the bottom and the water. With a boat of the illustrated type, a weight of 300 kg inclusive of motor and driver and an area of 4.2 m$^2$ against the water, a speed of about 21 knots is required in order to produce such air cushions 12 along the length of the boat. At lower speeds the air cushions are only partly produced. The illustrated boat is of the gliding type but it shall be noted that the invention also is suitable for boats of the half-gliding type, i.e. boats with lower top speed, for instance in the region of 12–18 knots. But it is apparent that the air cushion effect will be weaker at such half-gliding boats.

As mentioned, the production of air cushions under the boat bottom reduces the friction between the boat bottom and the water and causes a substantially lowered fuel consumption and an enhanced top speed at a given motor power. Thus, the dynamical pressure from the speed wind is made use of in order to produce air cushions in the channels under the boat.

Figure 5:
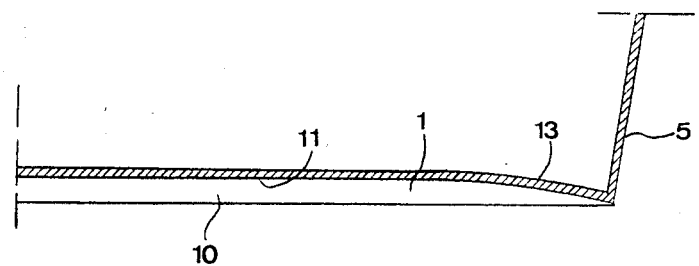
FIG. 5 is a detail view of a modified embodiment.

In FIG. 5 a variant embodiment of the invention is illustrated. At the embodiment according to FIGS. 1-4 the channels 1 are extending as far as to the square stern 5, as illustrated at the section V in FIG. 3, whereas in the embodiment according to FIG. 5 is illustrated how the bottom 11 of the channel 1 in the vicinity of the square stern 5 is sinking in order to, at the square stern, be located at the same level as the lower end of the projection 10. This can be attained through a uniformly curved transition 13 as illustrated in the figure. Thus, in this way the cross section of the channel 1 in the direction of the square stern 5 is reduced, which causes a certain resistance against air percolation through the channel and this can make the production of air cushions easier at lower speeds than the speeds which otherwise are required in order to attain this production. Though it is preferred that all channels in the boat bottom can be ended with such transitions 13, this can of course also be put into practice at one or a few of the channels. The reduction of the cross section of the channel 1 at the square stern 5 has not to be total but the cross section can for instance at the square stern be 50% of the cross section at the stem side of that place where the reduction of the cross section begins.

Of course the invention is not at all limited to the described embodiment. Thus, numerous modifications are possible within the scope of the claims.

I claim:

1. A boat hull having a keel line and a stem, said boat hull including a bottom which has a plurality of downwardly opening channels for receiving air during the forward movement of the boat in order to produce a reduction of the friction between the water and the bottom surface, said channels extending, viewed from above and from below respectively, along their whole length generally parallel to said keel line in the direction astern from places at said stem above the water surface to places under the water surface, an individual channel being limited laterally by two primarily vertical wall portions and upper surfaces of the channels being primarily horizontal, a certain plurality of adjacent ones of said channels localized on the same side of said keel line and having their upper primarily horizontal surfaces at different levels at the region of said stem merging into a single channel with a common primarily horizontal upper surface in the direction astern, said vertical wall portions which delimit said certain adjacent channels from each other being at least partly formed by a single downwardly projecting projection which where said certain adjacent channels merge into a single channel is gradually reduced in height while the upper surfaces of said certain adjacent channels gradually come closer to the levels of each other.

* * * * *